United States Patent
Cameron

(10) Patent No.: US 8,653,780 B2
(45) Date of Patent: Feb. 18, 2014

(54) INTEGRATED UPSAMPLER AND FILTERING FOR MULTI-RATE CONTROLLER FOR ELECTRO-MECHANICAL FLIGHT ACTUATION SYSTEM

(75) Inventor: Douglas C. Cameron, Ladera Ranch, CA (US)

(73) Assignee: The Boeing Company, Chicago, IL (US)

( * ) Notice: Subject to any disclaimer, the term of this patent is extended or adjusted under 35 U.S.C. 154(b) by 813 days.

(21) Appl. No.: 12/892,853

(22) Filed: Sep. 28, 2010

(65) Prior Publication Data

US 2012/0078446 A1    Mar. 29, 2012

(51) Int. Cl.
*G05B 6/02*    (2006.01)

(52) U.S. Cl.
USPC ............ 318/621; 318/638; 318/610; 318/597

(58) Field of Classification Search
USPC .................................. 318/621, 638, 610, 597
See application file for complete search history.

(56) References Cited

U.S. PATENT DOCUMENTS

| | | | | |
|---|---|---|---|---|
| 5,005,089 A | * | 4/1991 | Thanos et al. | 360/77.08 |
| 6,614,615 B1 | * | 9/2003 | Ju et al. | 360/78.04 |
| 6,614,618 B1 | * | 9/2003 | Sheh et al. | 360/78.09 |
| 6,636,377 B1 | * | 10/2003 | Yu et al. | 360/78.07 |
| 2010/0128238 A1 | * | 5/2010 | Sanchez | 355/62 |

* cited by examiner

*Primary Examiner* — Erick Glass
(74) *Attorney, Agent, or Firm* — Mark Pellegrini

(57) ABSTRACT

Presented is a system and method for controlling an actuator in a multirate control system using an integrated upsampler and filter, comprising an incremental command limiter for changing a command from a first control system into a limited incremental command in a second control system, a lead-lag filter for filtering the limited incremental command to attenuate high frequencies, and a feed forward path for reducing phase loss in rate output signal at low frequencies. In embodiments, a command position signal received at the sampling rate of the first control system is interpolated into incremental command position signals at the sampling rate of the second control system. Position error signals and rate error signals from the devices being controlled are used as feedback to further stability the control loops.

20 Claims, 6 Drawing Sheets

INTEGRATED UPSAMPLER AND FILTERING FOR MULTI-RATE CONTROLLER FOR ELECTRO-MECHANICAL FLIGHT ACTUATION SYSTEM

U.S. GOVERNMENT RIGHTS

This invention was made with Government support under the Risk Reduction Program, contract number 092AG9091. The Government has certain rights in this invention.

FIELD

Embodiments of the subject matter described herein relate generally to a system and method for upsampling and filtering a control signal in a control system that uses a different sampling rate than sampling rate of the control signal.

BACKGROUND

Many systems today, especially complex avionics systems, utilize pieces of mature technology that are combined with new technology to make the new system. It is generally more economical to use existing pieces of technology, rather than building something completely from the ground up. Reusing technology saves engineering resources that can be put to better use other parts on the system and often results in a product getting to market faster. Reusing technology saves test and verification time and resources, because a part that has already been qualified for a similar purpose generally does not need as many test cycles to verify.

Feedback control systems are commonly used in closed-loop flight control systems and other industrial or commercial products. Some well known feedback control system include lead-lag compensators and PID, or proportional plus integral plus derivative, feedback control loops. Lead-lag compensators and PID feedback control loops are well known in the art for stabilizing physical systems.

Flight control systems sometimes incorporate system components from different manufacturers that are combined to make a new system. System components that have somewhat different design specifications and parameters can exhibit undesirable behaviour when integrated together into a new system. For example, the sampling frequency for commands sent from a master computer to a closed-loop flight control system might be designed at a first frequency chosen so that the pilot or master computer has sufficient temporal granularity to accomplish a desired range of aerodynamic performance of the platform. However, the closed-loop flight control system may operate at a second much higher frequency that is designed to quickly adjust control surfaces during high speed flight with a much finer temporal granularity.

When commands are sent by the master computer at the first frequency, the closed-loop flight control system immediately adjusts the flight control surfaces in accordance to the command from the master computer at the second frequency of the closed-loop flight control system. When the closed-loop flight control system is operating at a higher frequency, or faster sampling rate, than the master computer, the closed-loop flight control system will have to wait a number of cycles between commands. This results in periodic, start-and-stop behavior of the electro-mechanical closed-loop flight control system in response to the commands from the master computer. The start-and-stop behavior acts like a "jack-hammer" on the platform and triggers structural modes at the first frequency of the commands from the master computer, causing the flight control system to exhibit undesirable behaviour.

One undesirable behavior that is triggered by the start-and-stop behavior is the creation of high current spikes that are sent to the flight control surfaces. When a command is received, the faster closed-loop flight control system immediately causes an actuation of a flight control surface, followed by the PID feedback loop attempting to stabilize the control surface to value presented in the command. This actuation by the closed-loop flight control system occurs at a high slew rate—the sampling rate of the closed-loop flight control system. This potentially results in full current commands during long slews, either with or without loads on the control surfaces.

The current spikes are followed by valleys of relatively low current usage by the flight control surfaces. This periodic demand of high current spikes followed by valleys of low current demand is inefficient from a power perspective, because it requires bigger power systems to supply power for the current spikes and also requires heavier wiring between systems. These current spikes place strains on the flight control surfaces. For example, current spikes associated with typical commands being operated on by the closed-loop flight control system can generate maximum loads on the flight control surfaces. High loads decrease the lifespan of components, requiring more scheduled maintenance and reducing the number of missions between servicing.

Another undesirable behavior resulting from the start-and-stop behavior is that lead-lag or PID feedback loop may not exhibit a desirable 40 dB/decade roll off past the specified bandwidth frequency of the closed-loop flight control system. This can lead to potential instability of the closed-loop flight control system. Attempts to attenuate the start-and-stop behavior generally result in increased phase changes that can create further instability in the system. For example, bi-quad filters on the command path can be used to smooth the command itself, but can cause unacceptable phase loss.

SUMMARY

Presented is a system and method for integrating multirate systems using a combination of nonlinear and linear filtering. In an embodiment, a method of nonlinearly smoothing low frequency commands from an outer-loop to high frequency controls within an inner loop is presented. A nonlinear upsampler applies linear filtering to attenuate the commands past the specified bandwidth frequency, thus enabling the inner-loop controls to provide maximum resistance to external disturbances without sacrificing high frequency attenuation to commands. In a non-limiting example embodiment, an algorithm upsamples the commands from a lower sample rate master computer system and generates higher sample controls in a closed-loop control system for flight actuators. In embodiments, the system and method provides smooth, quick performance with 40 dB decade gain attenuation past the specified bandwidth frequency of the closed-loop control system and reduces phase loss at frequencies critical to flight control system stability margins.

In an embodiment, the multirate system for controlling an actuator comprises an incremental command limiter for changing a command from a first control system into a limited incremental command for a second control system, a lead-lag filter for filtering the limited incremental command to attenuate high frequencies, and a feed forward path for reducing phase loss in rate output signal at low frequencies.

In an embodiment, the upsampler comprises a means for a means for computing a difference between position signal from a first control system, a means for dividing the difference into an incremental position signal based on the ratio of sampling rates between the first control system and a second control system, and adding the incremental position signals to the position signal for each cycle at the sample rate of a second control system until the next position signal is received from the first control system.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the system and method for integrating multirate systems for electro-mechanical flight actuation using an integrated upsampler and filter. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Figure 1:
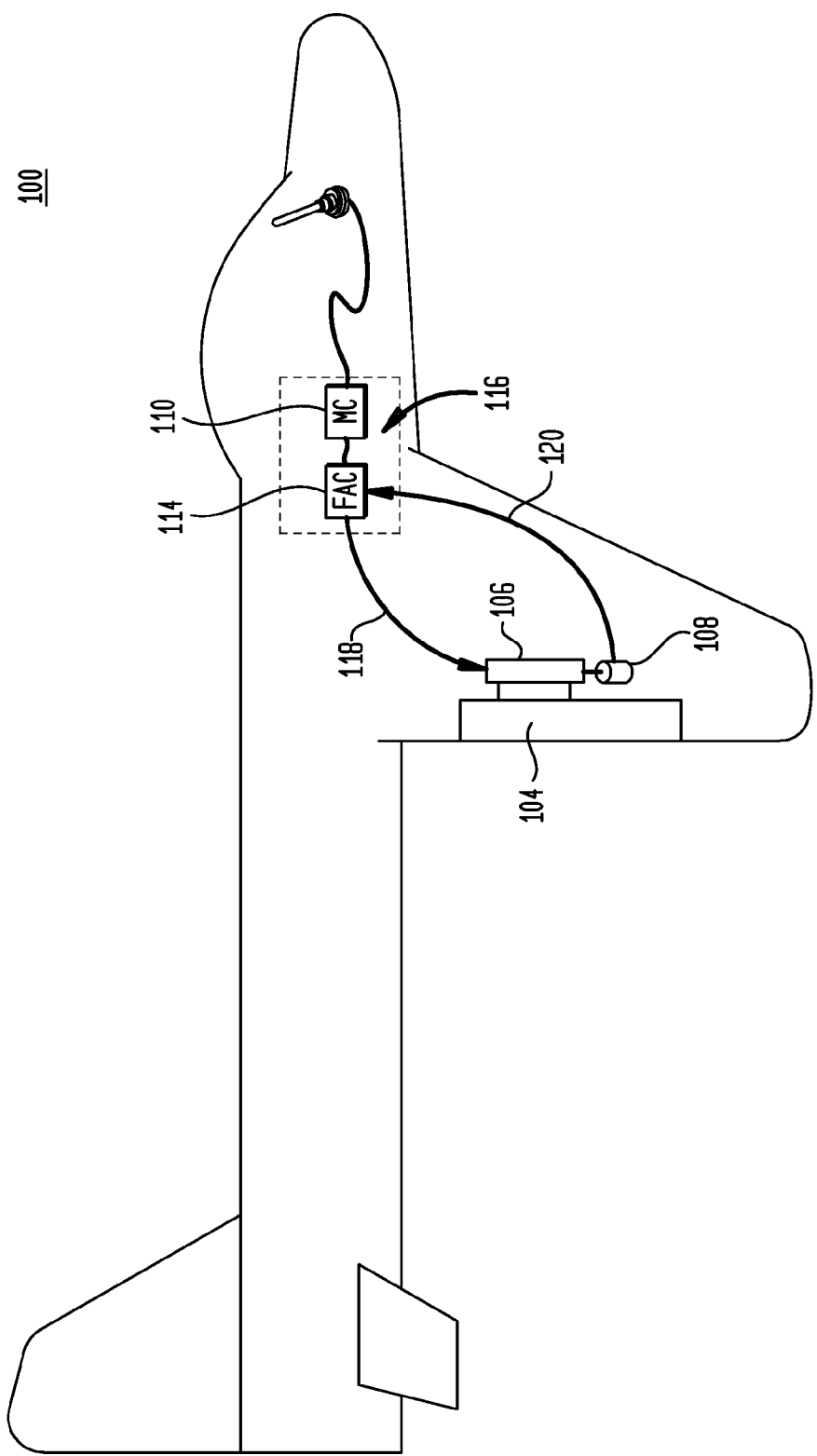
FIG. 1 is a diagram of a flight control system in one embodiment of the system and method for integrating multirate systems for electro-mechanical flight actuation using an integrated upsampler and filter.

Referring now to FIG. 1, an exemplary flight control system 100 is presented. The flight control system 100 comprises a vehicle 102, such as an aircraft, that has a flight control surface 104, such as an aileron, whose position is controlled by an actuator 106, such as an electromechanical actuator. The actuator 106 or the flight control surface 104 are in communication with a position/rate feedback sensor 108, for example a rotary sensor that is connected to the actuator 106. The position/rate feedback sensor 108 allows the flight control system 100 to know the precise position, angular rotation, and rate of the flight control surface 104. A master computer 110 sends a command signal 112 instructing the flight actuator controller or FAC 114 to reposition the flight control surface 104 to a particular position or angular rotation. The FAC 114, which is usually located in the avionics bay 116, sends an actuation signal 118 to the actuator 106 to move the flight control surface 104. In embodiments, the actuation signal 118 is a current or a signal to another device to supply current into the actuator 106 to actuate the flight control surface 104. A feedback signal 120 returns from the position/rate feedback sensor 108 to the FAC 114.

In a flight control system 100 it is possible to have a master computer 110 that is issuing flight related commands at a first sample rate or frequency and a flight actuation control system or FAC 114 that operates at a second faster sample rate or higher frequency. For example, the sampling frequency for commands sent from a master computer 110 to the flight control system, or FAC 114, might be designed at a first frequency chosen so that the pilot and master computer 110 has sufficient temporal granularity to accomplish a desired range of aerodynamic performance of the platform, or vehicle 102. However, the FAC 114 may operate at a second much higher frequency that is designed to quickly adjust control surfaces 104 during high speed flight with a much finer temporal granularity.

Because of the differences in the sample rates, or frequencies, between the two system components, the master computer 110 and the FAC 114, an undesirable behaviour can result. For example, if the master computer 110 operates at 50 Hz, then 50 times per second the master computer 110 would send command signals 112 to update the actuator 104 position to the flight actuator controller or FAC 114. However, if the FAC 114 operates at 2000 Hz, then the FAC 114 operates the flight actuators 104 at 2000 Hz. Because of this difference between the sample rates, or frequencies, the FAC 114 sees the command signals 112 as a series of stair-step position commands from the master computer 110 that are spaced 40 cycles apart. That is, after the FAC 114 sees a first command signal 112, the FAC 114 does not see a change in the position of the control surface via a change in the command signal 112 for another 40 cycles (2000 Hz/50 Hz.) When the FAC 114 sees the next command signal 112 with a change, it immediately changes the position of the flight control surface 104, and then waits another 40 cycles for the next command signal 112.

The maximum increment between 2000 Hz samples should be RateLimit/2000. But, it is using RateLimit/50. Therefore, the response of the FAC 114 is to a rate that appears 40 times greater than desired by the master computer 110. This high rate command during the first 0.006 seconds of the 50 Hz frame causes a jerking and full current command. The response of the actuator 106 is a jerking, then as the position rate error becomes in the stabilizing direction, the actuation torque is arresting. Therefore, a jerk forward, slow down, jerk forward, slow down motion occurs at 50 Hz. This effectively causes a 50 Hz jack-hammering from an 8 Hz bandwidth actuation system.

Before the upsampler, many methods were attempted to attenuate the jack-hammering, but they resulted in increased phase at the 1-2 hz frequencies, where the master computer 110 stability margins are extremely critical. For instance, bi-quad filters on the command path smoothed the "jerk," but caused unacceptable phase loss at 1 to 2 hz that could not be tolerated by the master computer 110. Changing the FAC 114 commanding from position commands at 50 Hz to rate commands at 50 hz, would eliminate the jack-hammering, but the master computer 110 would need to close the position loop, but the cost of overhauling the completed master computer software would be too costly, require years of rework and certification, and would have less robustness than the FAC 114 closing the position loops. Therefore, a method that eliminated the jack-hammering, reduced phase loss at low frequencies, and preserved the quick response under load was needed. The upsampler 202, 204, 206 provides this solution.

Figure 2A:
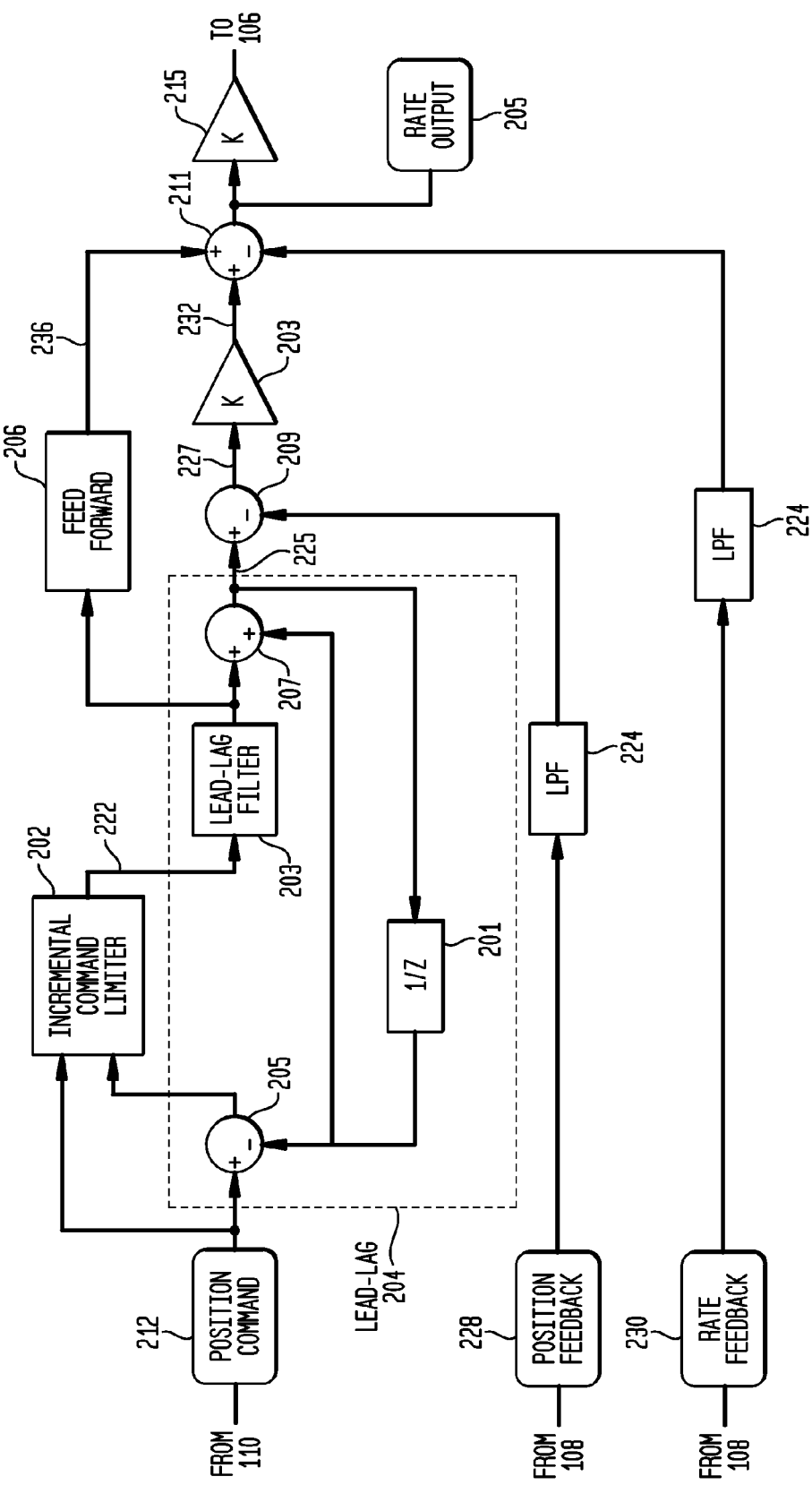
FIG. 2a is a diagram of a simplified position/rate closed loop controller having an integrated upsampler and filter in one embodiment of the system and method for integrating multirate systems for electro-mechanical flight actuation using an integrated upsampler and filter.

Referring now to FIG. 2a, a simplified diagram of a position/rate closed-loop controller 200 having an integrated upsampler 202, 204, 206 is presented. The upsampler 202, 204, 206 consists of three primary elements, the incremental command limiter 202, the lead-lag on limited incremental command 204, and the feed-forward path 206.

The position/rate closed-loop controller 200 receives a command signal 112 from another controller, for example a position command 212 from the master computer 110. The incremental command limiter 202 interpolates the position command 212 into the sampling rate of the position/rate closed-loop controller 200 and feeds a limited incremental command to the lead-lag on limited incremental command 204.

The lead-lag filter 204 shapes the limited incremental command 222 in order to attenuate the high frequency components in the position commands 212 (e.g., greater than specified bandwidth of the system.) The feed-forward 206 produces a feed forward rate command 226 that reduces phase loss at low frequencies (e.g., less than 2 Hz). Together, the lead-lag filter 204 and feed-forward 206 perform lead-lag compensation for the control loop of the position/rate closed-loop controller 200 and are therefore sometimes called a lead-lag compensator. The upsampler state 201 feeds the current state back to a differentiator, or summer 205, that is used, in part, to limit the limited incremental command 222 to a maximum allowable command. And a summer 207 in the lead-lag on limited incremental command 204 produces the filtered incremental command signal. A differentiator, or summer 209 compares the filtered incremental command signal 225 to the position feedback signal 228 to derive a position error signal 227 which is processed and amplified by amplifier 213 to produce the rate command 232. A summer 211 combines the rate command 232, with the feed forward rate command 226 and the rate feedback 230 to produce the rate output signal 205. A power amplifier 215 produces a pulse width modulated current for actuating the actuator 106 from the rate output signal 205. One or more elliptical filters, biquad filters, or low pass filters 224 help to attenuate noise from position/rate signal(s) from the position/rate feedback sensor 108.

Figure 2B:
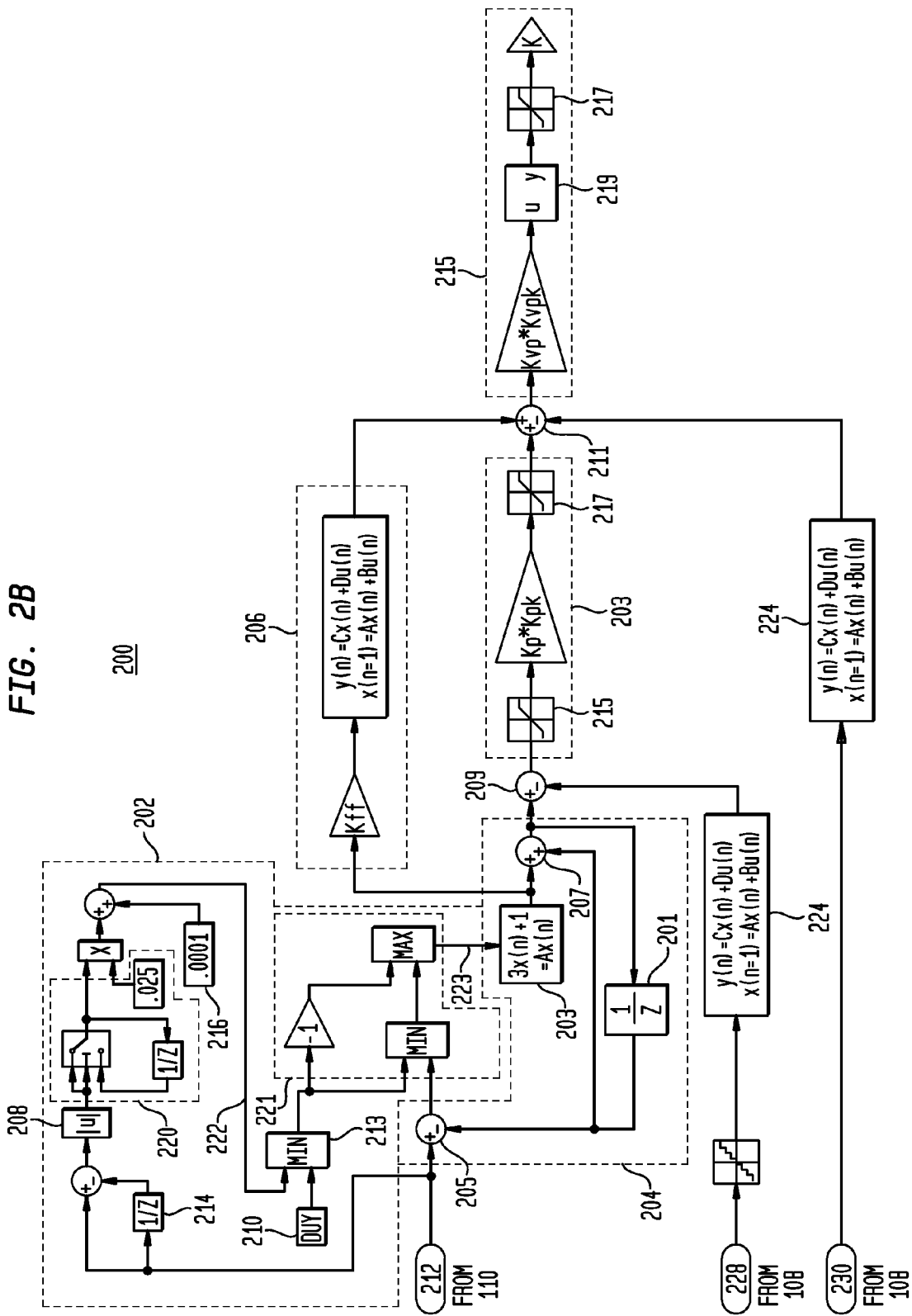
FIG. 2b is a diagram of a position/rate closed loop controller having an integrated upsampler and filter in one embodiment of the system and method for integrating multirate systems for electro-mechanical flight actuation using an integrated upsampler and filter.

Referring now to FIG. 2b, a more detailed diagram of a position/rate closed-loop controller 200 is presented to describe additional features. The incremental command limiter 202 differences the upsampler state 214 from the last received command 212 from the master computer 110 to produce a difference 208 whose value is an unpolarized absolute value. This difference 208 is limited to an increment no larger than the intended rate command 212 from the master computer 110. For small rates, a bias 216 shown in one non-limiting example as 0.0001 units, is added to prevent sluggish motion. An interpolator 220 divides the difference 208 into smaller incremental changes according to the ratio of the sample rate of the master computer 110 (50 Hz) and the FAC 114 (2000 Hz), shown here as 50/2000 or 0.025 units. Although the system is illustrated having a FAC 114 whose sample rate is an integer multiple of the computer 110, it should be noted that other ratios can be used. In embodiments, ratios between 1 and the actual ratio between the two system can be used. In embodiments, linear interpolation, logarithmic interpolation, and other non-linear interpolation schemes could be utilized to create the incremental changes without deviating from this disclosure.

For each cycle of the FAC 114, the incremental command 222 has added to it the difference 208 multiplied by 0.025, so that after 40 cycles the incremental command 222 has a position value equal to the command 212 sent by the master computer. A delta upper yield, or DUY 210, provides a reference value used by an unpolarized clipper 213 to clip the incremental command 222 if necessary to prevent the incremental command 222 from exceeding the maximum allowable position change. A repolarizer 221 restores the positive or negative polarization of the incremental command and in combination with the unpolarized clipper 213 produces the limited incremental command 223.

In embodiments, the amplifier 203 comprises a hysteresis function 215 to prevent least significant bit (LSB) chatter from being introduced into the rate command. In embodiments, a clipper 217 in either the amplifier 203 or power amplifier 215 prevents rate commands from exceeding a amplitudes that may create too much stress on the actuator 106 or other structures of the vehicle 102. In embodiments, the power amplifier 215 comprises a rate to pulse-width modulation converter 219.

Figure 3:
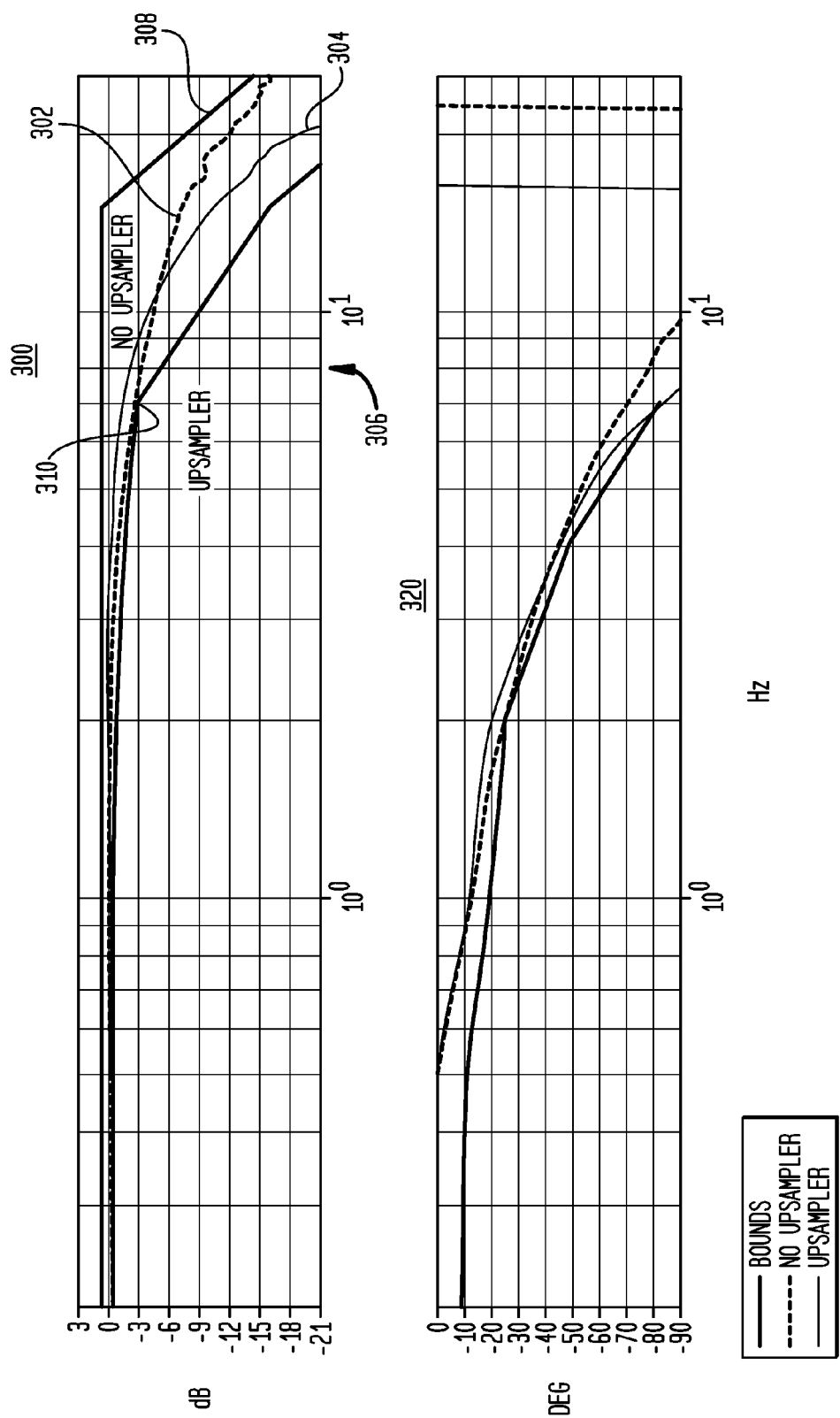
FIG. 3 is a graph illustrating the upsampler transfer function response and phase for position commands in one embodiment of the system and method for integrating multirate systems for electro-mechanical flight actuation using an integrated upsampler and filter.

Referring now to FIG. 3, a diagram of the transfer function response 300 from position command to position response is illustrated. The upsampler transfer function response 304 shows a great improvement over the non-upsampled transfer function response 302. The non-upsampled transfer function response 302 nearly touches the acceptable lower bound 310 near the 8 Hz frequency 306 where jack-hammering is observed, while at high frequencies the non-upsampled transfer function response 302 approaches the acceptable upper bound 308. The upsampler transfer function response 304 is between the acceptable lower bound 310 and acceptable upper bound 308 for all frequencies, and also shows a greatly improved roll-off at higher frequencies. In the phase diagram 320, the upsampler transfer function response 304 also shows improved phase response at low frequency.

Figure 4:
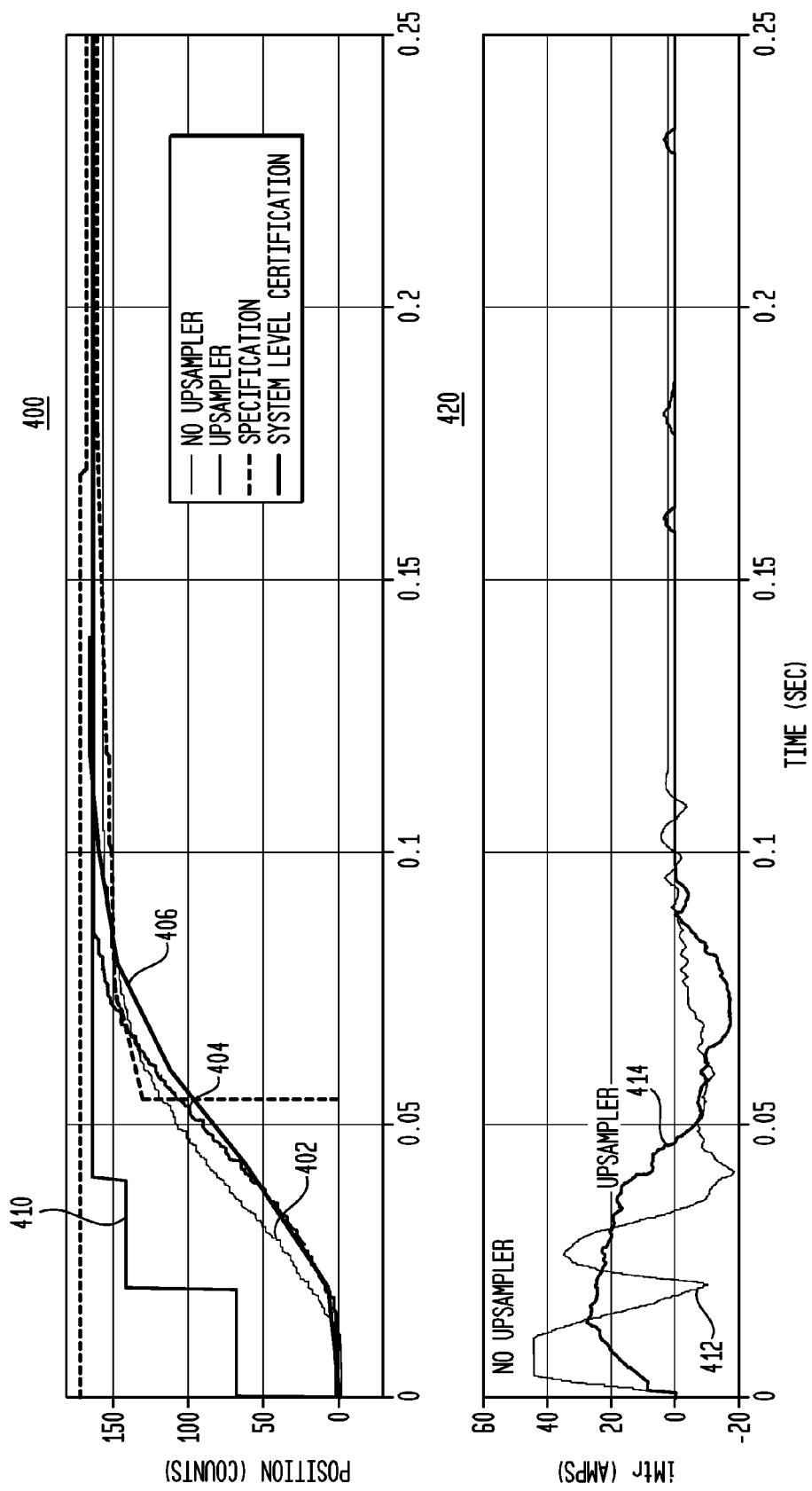
FIG. 4 is a graph illustrating the upsampler instantaneous current response corresponding to position commands for the closed-loop control system in one embodiment of the system and method for integrating multirate systems for electro-mechanical flight actuation using an integrated upsampler and filter; and, FIG. 5 is a graph illustrating a current response profile corresponding to a plurality of example position commands for the closed-loop control system in one embodiment of the system and method for integrating multirate systems for electro-mechanical flight actuation using an integrated upsampler and filter.

Referring now to FIG. 4, diagrams of the upsampler instantaneous position response 400 and upsampler instantaneous current response 420 during a series of position commands 410 is presented. As illustrated, during a series of position commands 410, the non-upsampled position response 402 accelerates rapidly, but takes longer to reach the level of the final position command 410. The upsampled position response 404 accelerates more evenly along the desired response slope 406, and reaches the level of the final position command 410 before the non-upsampled position response 402.

As illustrated, during the series of position commands 410, the non-upsampled current 412 swings back and forth as the actuator 104 is first accelerated, and then decelerated. At one point, the non-upsampled current 412 even clips, meaning that the maximum amount of current is being applied to the actuator 104. In comparison, the upsampled current 414 illustrates a more smooth amount of power being applied to the actuator 104.

The upsampler instantaneous position response 400 and upsampler instantaneous current response 420 illustrate the "go-stop" nature of the response without upsampler in comparison to the smooth response with the upsampler 202, 204, 206. Further, it is apparent that without the upsampler 202, 204, 206, the system requires a higher amount of instantaneous current to be available, meaning that the upsampler 202, 204, 206 can reduce the size of the power source necessary to power the actuators 104. Further, the non-upsampled current 412 shows the wasting of power when an opposite current is necessary to decelerate the actuator 104.

Figure 5:
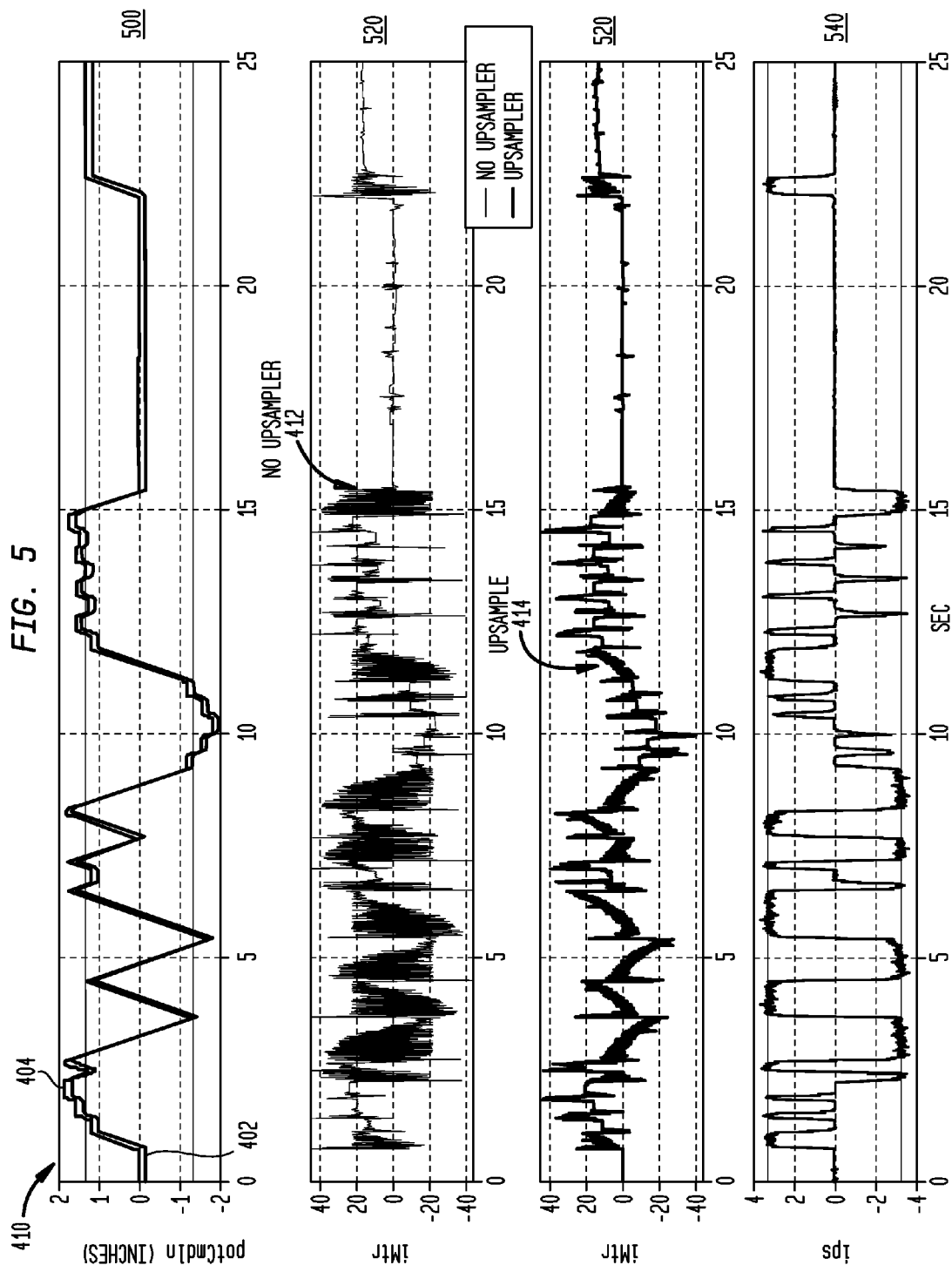

This oscillation of the instantaneous current is illustrated in diagrams of the upsampler position response 500, upsampler current response 520, and upsampler pulse widths 540 in the diagrams of FIG. 5. Similar to FIG. 4, in the upsampler position response 500, in response to a series of position commands 410, the upsampled position response 404 reaches the level of the position commands whereas the non-upsampled position response 402 lags. In the upsampler current response 520, the response curves illustrate the difference between the smooth upsampled current 414 response curves, and the oscillating non-upsampled current 412 response curves. The upsampler pulse widths 540 illustrates the corresponding pulse width modulation of the actuators 104.

Although some of the embodiments of the disclosure are directed to flight control systems 100, the methodology and systems described above are also applicable to integrating multirate control systems in general. For example, the upsampler 202, 204, 206 or portions of the upsampler 202, 204, 206 can be incorporated into an industrial control system in manufacturing plants when two controllers in a manufacturing process utilize different sampling rates.

The embodiments of the invention shown in the drawings and described above are exemplary of numerous embodiments that may be made within the scope of the appended claims. It is contemplated that numerous other configurations of the system and method for integrating multirate systems using an integrated upsampler and filter may be created taking advantage of the disclosed approach. It is the applicant's intention that the scope of the patent issuing herefrom will be limited only by the scope of the appended claims.

What is claimed is:

1. A multirate system for controlling an actuator, comprising:
   an incremental command limiter that outputs a limited incremental command;
   a lead-lag filter for filtering said limited incremental command;
   a position error signal from the actuator;
   a first summer for producing a rate command from said limited incremental command and said position error signal;
   a feed forward path for producing a feed forward rate command from said limited incremental command; and,
   a second summer for producing a rate output signal from said rate command and said feed forward rate command.

2. The system of claim 1, wherein said multirate system comprises a first control system and a second control system, and wherein said incremental command limiter interpolates a command from said first control system into a limited incremental command of said second control system.

3. The system of claim 2, wherein said first control system has a first sampling rate, and said second control system has a second sampling rate different than said first sampling rate.

4. The system of claim 3, wherein said first control system sends said command to said second control system at said first sampling rate, and said second control system interpolates said command into said limited incremental command at said second sampling rate.

5. The system of claim 3, wherein said second sampling rate is an integer multiple of said first sampling rate.

6. The system of claim 1, wherein said lead-lag filter shapes said limited incremental command to attenuate high frequencies.

7. The system of claim 1, wherein said feed forward rate command reduces phase errors in said rate output signal at low frequencies.

8. The system of claim 1, further comprising:
   a rate error signal from the actuator; and
   wherein said second summer for produces said rate output signal from said feed forward rate command, said rate command, and said rate error signal.

9. The system of claim 8, further comprising:
   a low pass filter for attenuating noise in said rate error signal from the actuator; and,
   a low pass filter for attenuating noise in said position error signal from the actuator.

10. The system of claim 1, further comprising:
    an amplifier for converting said output signal into a pulse width modulated current for actuating the actuator.

11. A method of integrating multirate control systems, comprising:
    receiving a command position signal at a first sampling rate;
    interpolating said command position signal into a incremental command position signal at a second sampling rate;
    filtering said incremental command position signal to attenuate high frequencies in said incremental command position signal;
    summing a position error signal and said incremental command position signal to produce a rate command;
    producing a feed forward rate command from said limited incremental command to prevent phase loss at low frequencies; and,
    summing said rate command and said feed forward rate command to produce a rate output signal.

12. The method of claim 11, wherein said operation of filtering said incremental command position signal and said operation of producing said feed forward rate command is performed by a lead-lag compensator.

13. The method of claim 11, wherein said operation of interpolating comprises:
    computing a difference from said command position signal and a previous command position signal;
    dividing said difference into an increment according to a ratio between said first sample rate and said second sample rate;
    adding said increment to said previous command position signal to obtain said incremental position signal for a first cycle at said second sample rate;
    adding said increment to said incremental position signal for each subsequent cycle at said second sample rate until a next command position signal is received.

14. The method of claim 11, further comprising:
    receiving a rate error signal; and
    wherein said operation of summing comprises summing said rate command, said rate error signal, and a feed forward rate command to produce an output signal.

15. The method of claim 14, further comprising:
    filtering said rate error signal to attenuate noise in said rate error signal; and
    filtering said position error signal to attenuate noise in said position error signal.

16. The method of claim 11, further comprising:
converting said rate output signal into a pulse width modulated current.

17. The method of claim 16, further comprising:
applying said pulse width modulated current to an actuator associated with the multirate control system.

18. An upsampler for modifying commands between a plurality of control systems, comprising:
- a means for computing a difference between a first command position signal and a second command position signal from a first control system;
- a means for dividing said difference into an incremental command according to a ratio between a first sample rate of said first control system, and said second sample rate of a second control system;
- a means for adding said incremental command to said first command position signal to obtain an incremental position signal for a first cycle at said second sample rate;
- a means for adding said incremental command to said incremental position signal for each subsequent cycle at said second sample rate until a third command position signal is received.

19. The upsampler of claim 18, wherein said first control system sends said first command position signal to said second control system at said first sampling rate, and said second control system element interpolates said command into said incremental position signal at said second sampling rate, and wherein said second sampling rate is an integer multiple of said first sampling rate.

20. The upsampler of claim 18, wherein the upsampler is integrated into a control loop of said second control system, and wherein said control loop of said second control system controls a physical device using said incremental position signal.

* * * * *